US007422522B2

(12) United States Patent
Fujimoto et al.

(10) Patent No.: US 7,422,522 B2
(45) Date of Patent: Sep. 9, 2008

(54) GAME MONITORING SYSTEM, GAME PLAYING TABLE AND MONITORING METHOD

(75) Inventors: Jun Fujimoto, Tokyo (JP); Nobuyuki Nonaka, Tokyo (JP); Tomitsugu Itakura, Tokyo (JP)

(73) Assignees: Aruze Corp., Tokyo (JP); Seta Corp., Tokyo (JP)

( * ) Notice: Subject to any disclaimer, the term of this patent is extended or adjusted under 35 U.S.C. 154(b) by 573 days.

(21) Appl. No.: 10/235,947

(22) Filed: Sep. 6, 2002

(65) Prior Publication Data

US 2003/0064774 A1 Apr. 3, 2003

(30) Foreign Application Priority Data

Sep. 7, 2001 (JP) ............................ 2001-271496

(51) Int. Cl.
*A63F 13/00* (2006.01)

(52) U.S. Cl. ............................ 463/16; 463/39; 463/42

(58) Field of Classification Search ...................... None
See application file for complete search history.

(56) References Cited

U.S. PATENT DOCUMENTS 5,581,257 A * 12/1996 Greene et al. ................. 342/51
5,605,334 A * 2/1997 McCrea, Jr. ................. 273/309
5,651,548 A * 7/1997 French et al. ................. 463/25
5,735,742 A 4/1998 French
5,770,533 A * 6/1998 Franchi ....................... 463/42
5,779,546 A * 7/1998 Meissner et al. .............. 463/25
5,831,527 A * 11/1998 Jones et al. ................. 340/540
5,941,769 A * 8/1999 Order ......................... 463/12
6,126,166 A * 10/2000 Lorson et al. ........... 273/148 R
6,154,131 A * 11/2000 Jones et al. ................. 240/540
6,186,895 B1 2/2001 Oliver
6,254,002 B1 * 7/2001 Litman ....................... 235/450
6,299,536 B1 * 10/2001 Hill ............................ 463/47
6,460,848 B1 * 10/2002 Soltys et al. ............ 273/149 R
6,676,517 B2 * 1/2004 Beavers ....................... 463/25
6,685,568 B2 * 2/2004 Soltys et al. .................. 463/47
6,753,830 B2 * 6/2004 Gelbman ..................... 345/55

(Continued)

FOREIGN PATENT DOCUMENTS

WO WO 00/22585 A3 4/2000

*Primary Examiner*—Ronald Laneau
*Assistant Examiner*—Tramar Harper
(74) *Attorney, Agent, or Firm*—Leydig, Voit & Mayer, Ltd.

(57) ABSTRACT

To prevent calculation errors and fraudulent acts and reduce cost by automatic monitoring, a wirelessly communicating game monitoring system includes an identifying information recording device, attached to playing cards or the like, for recording identifying information of the card; an identifying information reading device for reading wirelessly the information recorded in the identifying information recording device; a control device for performing various kinds of calculations or determinations required in the process of games using the identifying information read with the identifying information reading devices; and a display divce for displaying the results of the calculation or determination made with the control divce. The system also includes stake money handling devices for players to operate and enter stake money amounts, an output divce for outputting summed results after the end of games, and a recording divce for recording identifying information and calculation results. The game monitoring system is built into a game playing table on which playing cards are dealt to play games.

17 Claims, 4 Drawing Sheets

U.S. PATENT DOCUMENTS 6,834,251 B1 * 12/2004 Fletcher ...................... 702/150
2002/0042298 A1 * 4/2002 Soltys et al. .................. 463/29
2002/0068635 A1 * 6/2002 Hill ............................. 463/47
2002/0147042 A1 * 10/2002 Vuong et al. .................. 463/40
2003/0003997 A1 * 1/2003 Vuong et al. .................. 463/42

* cited by examiner

GAME MONITORING SYSTEM, GAME PLAYING TABLE AND MONITORING METHOD

BACKGROUND OF THE INVENTION

1. Field of the Invention

The present invention relates to a game monitoring system, a game playing table and a game monitoring method for preventing accounting errors and wrongful acts in games.

2. Description of the Related Art

In card games played in casinos or the like, calculation of stake money associated with win and loss is made by a dealer or like person. However, errors often occur in such games in which people vie with each other. Calculation errors and wrongful acts are inevitable. For example, such errors and wrongful acts can occur as an excessive chip payment to a winning player, or a dealer making a false balance report to an accountant after picking out some of the chips.

To carry out fair games by preventing the errors and wrongful acts from occurring, monitoring staff members are deployed. They monitor so that games are played in a fair manner.

However, employment of monitoring staff members results in an increase in personnel expenses. On the other hand, wrongful acts may be perpetrated by dealers in collusion with players. While increasing the number of monitoring staff members may be conceivable to prevent such a situation by causing the staff members to monitor each other, such a measure would further increase the personnel expenses and result in poor profitability in running casinos or the like.

The present invention has been made in view of the above points and it is an object to provide a game monitoring system, a game playing table, and a game monitoring method that prevent calculation errors and wrongful acts by automatically monitoring the development of games (game results and money balance) and that reduce costs.

SUMMARY OF THE INVENTION

A game monitoring system related to the present invention comprises: an wirelessly communicable dentifying information recording means, attached to a game-use object, for recording at least information for identifying a self; an identifying information reading means for reading wirelessly the information recorded on the identifying information recording means; a control means for performing various calculation or judgment required in a process of a game on the basis of identifying information read with the identifying information reading means; and a display means for displaying a result of the calculation or judgment made with the control means.

With the above constitution, typically, identifying information recorded in the game-use object such as cards and chips is read with the identifying information reading means, and various calculation or decisions required as the game goes on is carried out on the basis of the identifying information by means of the control means. Here, both of the various calculation and decisions may be carried out. The calculation is related to refunds associated with wins and losses or the like. The judgment is related to comparison of cards in hand of players and superiority of the cards or the like. The results of calculation or the like made with the control means are displayed on the display means. Players can confirm points in hand or winning points while watching the display means. The dealer, watching the display means, can also confirm the chip amount to be paid to the winning players. In the control means, all the processing made during the game are recorded, and balance is calculated after the end of the game. In this way, burden of accounting work on the dealer is alleviated.

For the above game monitoring system it is preferable to comprise a stake money handling means for players to operate and enter or change bet money.

With the above constitution, the stake money handling means is operated to enter stake money in order to bet. The entered amount is displayed on the display means. The players and the dealer can go on with the game while confirming what is displayed with the display means.

The above game monitoring system preferably comprises an output means for outputting the results of money balance summed up with the control means after the end of the game.

With the above constitution, since the results of money balance are outputted by the output means, burden of accounting work on the dealer is alleviated. The output means is provided in a monitoring station or a card game playing table. It is provided either in the monitoring station or the card game playing table, or in both of them, as required.

The above game monitoring system is particularly effective when the game-use objects are cards.

In the case of playing cards, numerals or the like serve as identifying information, so that card combinations are easily recognized, and the win-loss judgment with the control means is facilitated. In this way, the amount of chips or the like payable to the winning players can be calculated accurately.

The above game monitoring system preferably comprises a recording means for recording the identifying information read with the identifying information reading means, and the results of calculation or judgment made with the control means. Both of the results of calculation and judgement may be recorded.

With above constitution, the game results may be accumulated as a database in the recording means. Thus, wrong acts may be detected retroactively by checking the accumulated game results at a later time. That is to say, in the case any doubt about money balance of a specific date arises at a later date, wrong acts may be revealed retroactively by reviewing the data of the day's game results or the like.

A game playing table related to the present invention is the one for playing games with a game-use object such as a card distributed or laid thereon, comprising a game monitoring system installed therein.

With the above constitution, the identifying information recorded on the identifying information recording means mounted on the card or the like is read with the identifying information reading means while the game is going on, various calculation or judgment required as the game goes on is made with the control means, and the results are displayed on the display means. The players and the dealer can proceed with the game while confirming the display means. Balance is calculated when the game is over.

The basic Japanese Patent Application No. 2001-271496 filed on Sep. 7, 2001 is hereby incorporated in its entirety by reference into the present application.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

DESCRIPTION OF THE PREFERRED EMBODIMENTS

Details of the game monitoring system, the game playing table and the game monitoring method related to the present invention are described in reference to the accompanying drawings. The game described here is mainly about a game for example using playing cards. Therefore, the game monitoring system can be considered as a card game monitoring system. And the card game monitoring system is described as the one that is incorporated in a card game playing table.

Figure 1:
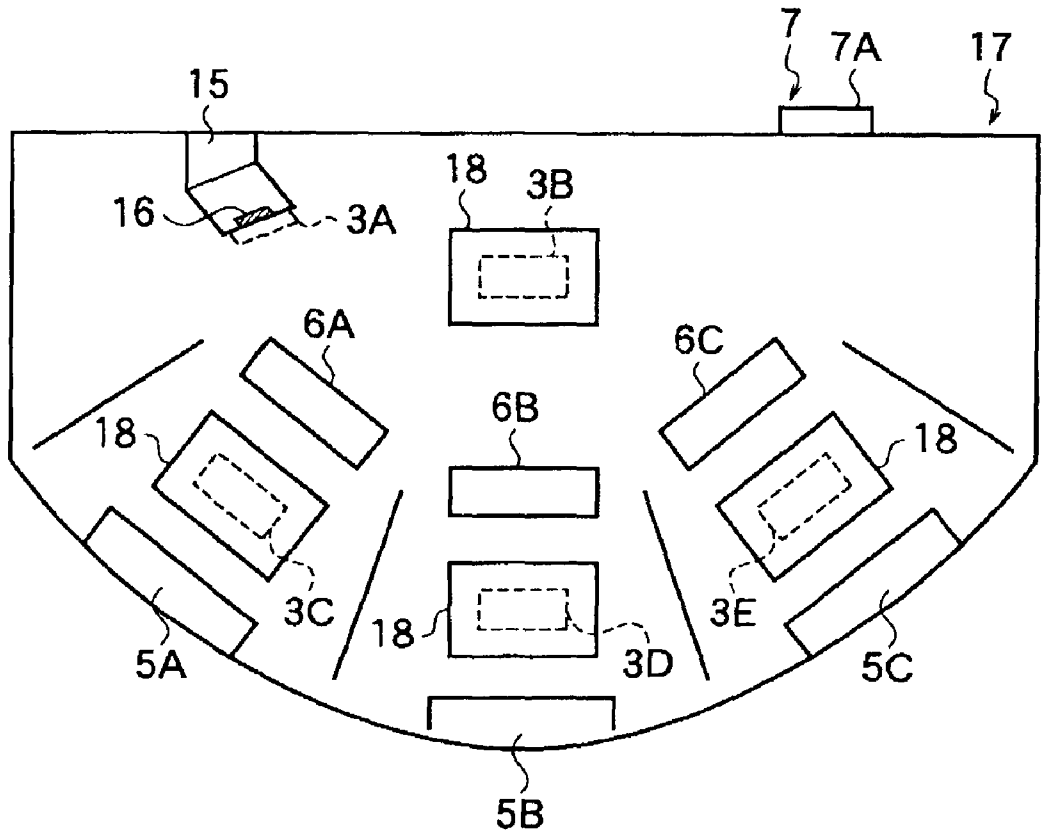
FIG. 1 is a plan view, showing a card game playing table according to an embodiment of the present invention.
Figure 2:
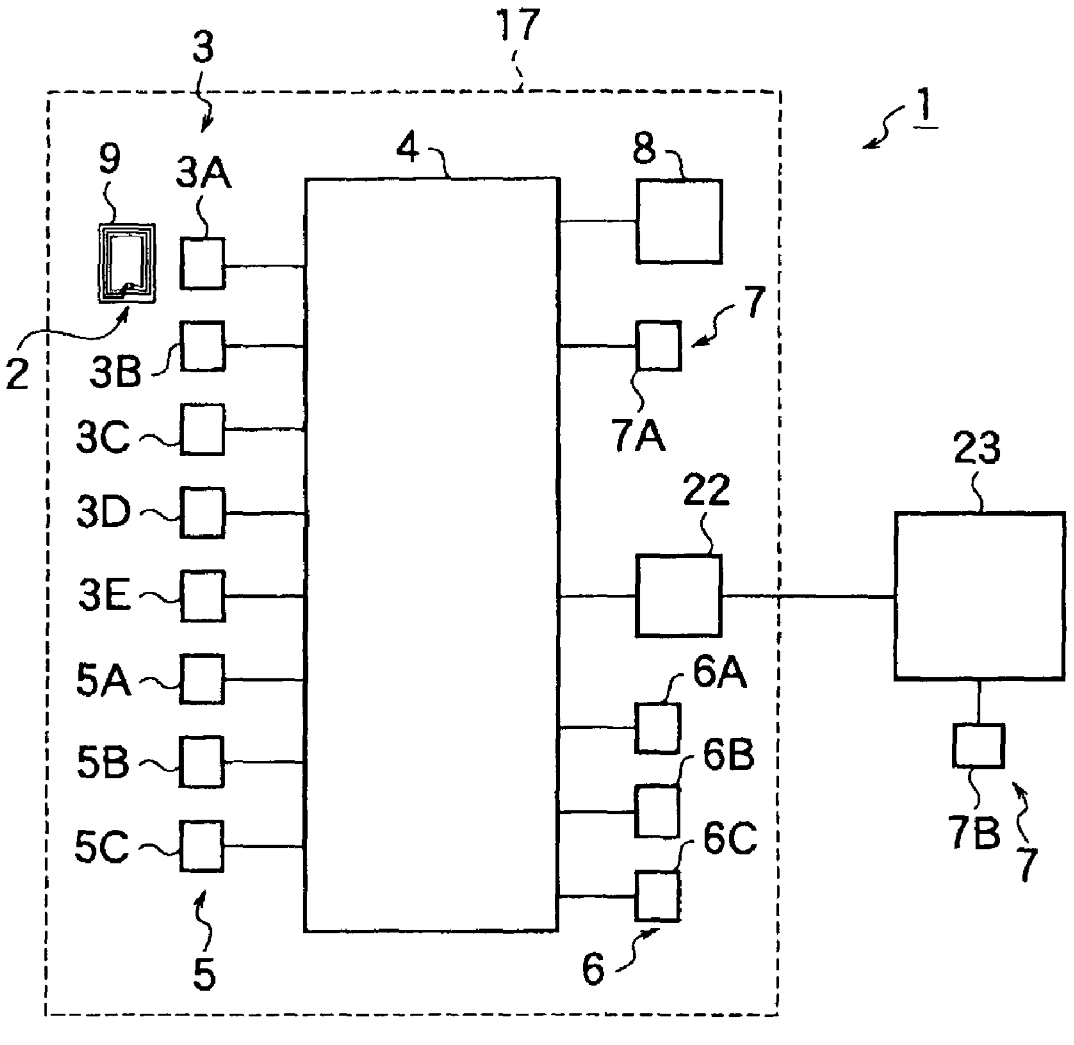
FIG. 2 is a schematic diagram of a card game monitoring system according to an embodiment of the present invention.
Figure 3:
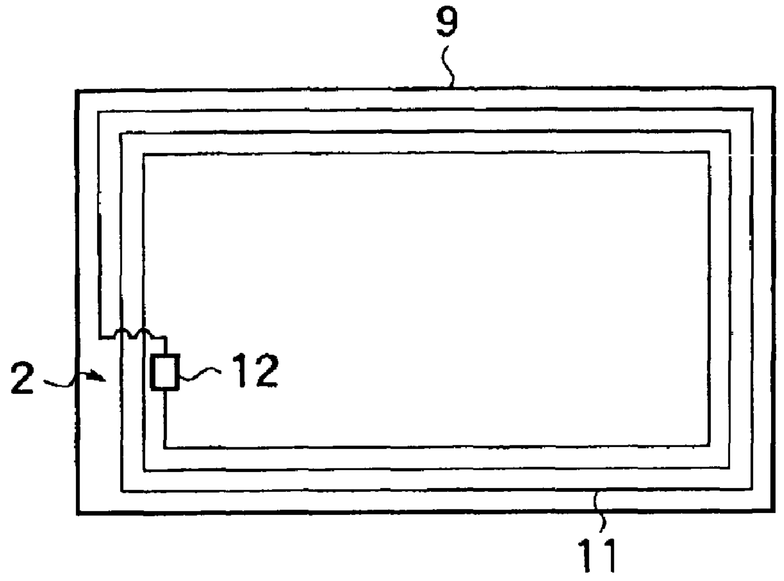
FIG. 3 is a plan view, showing an identifying information recording device embedded in a card according to an embodiment of the present invention.
Figure 4:
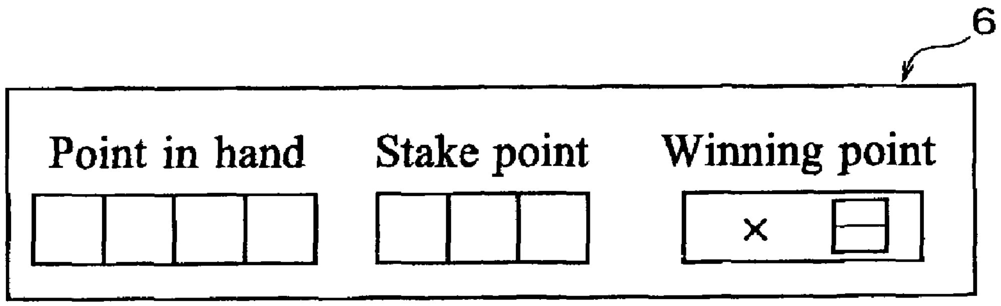
FIG. 4 is a plan view, showing a display device according to an embodiment of the present invention.
Figure 5:
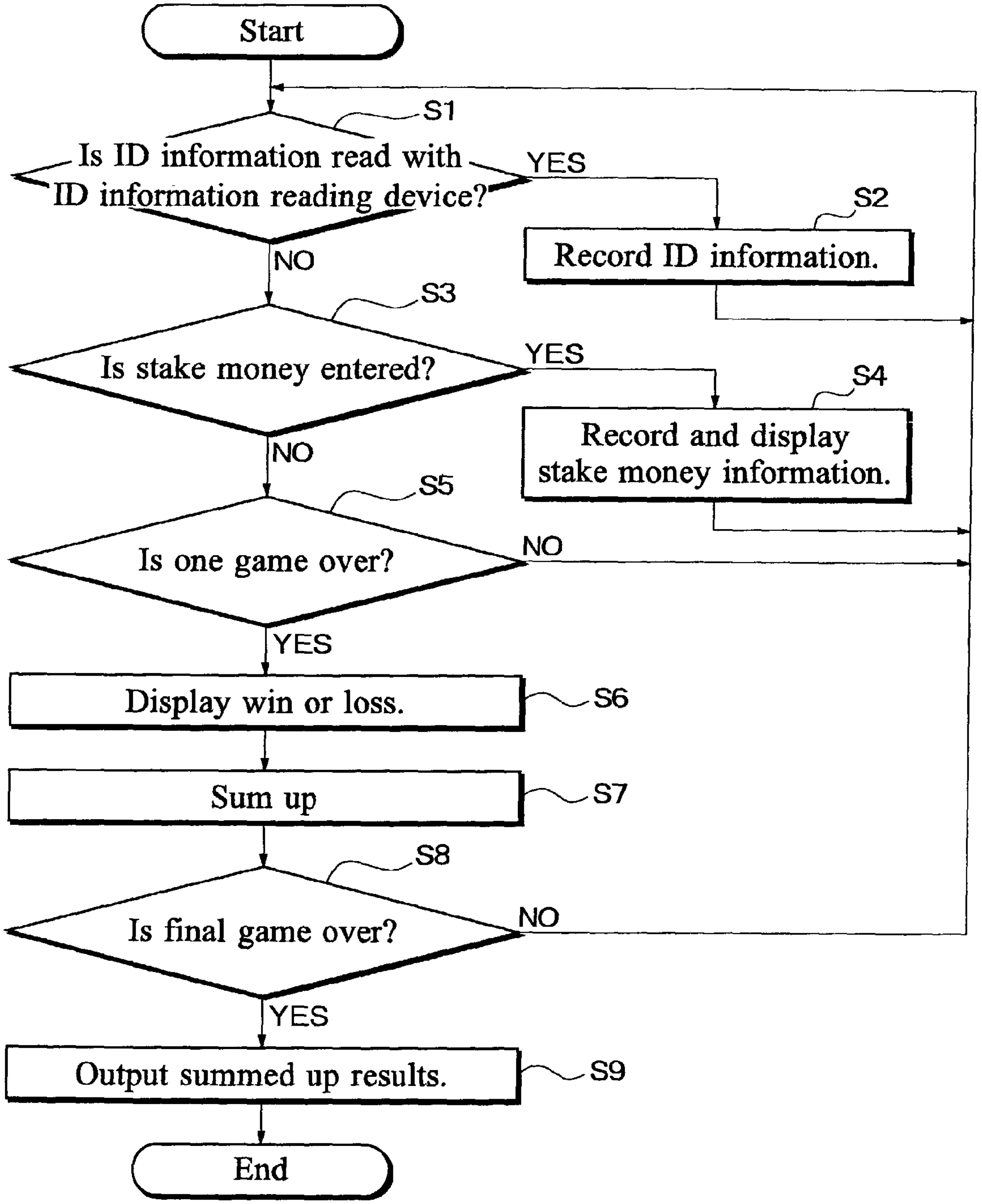
FIG. 5 is a flowchart, showing the function of a control device according to an embodiment of the present invention.

FIG. 1 is a plan view of a card game playing table. FIG. 2 is a schematic diagram of a card game monitoring system. FIG. 3 is a plan view of an identifying information recording device embedded in a card. FIG. 4 is a plan view, showing a display device. FIG. 5 is a flowchart, showing the function of a control device.

The card game monitoring system 1 is a device for monitoring that calculation errors and wrong acts do not occur in card games. The card game monitoring system 1 is constituted as shown in FIG. 2 mainly with the identifying information recording device 2, the identifying information reading device 3, the control device 4, a stake money handling device 5, the display device 6, the output device 7, and the recording device 8.

The identifying information recording device 2, embedded in the card 9 as shown in FIG. 3, is a means for recording various pieces of information. In the case of the game using playing cards for example, the information to be recorded includes at least the numeral information on the card, for identifying a self. Besides, a date, a place, etc. may be recorded appropriately as required. The identifying information recording device 2 is provided with a wireless communication function. To put it more specifically, it is provided with an antenna coil 11, an IC chip 12, a tuning capacitor, a rectifying diode, and a smoothing capacitor. Incidentally in the drawing, the tuning capacitor, the rectifying diode, and the smoothing capacitor are installed within the IC chip 12. The antenna coil 11 and the tuning capacitor constitute a resonance circuit.

The antenna coil 11 is annularly wound several turns along the marginal region of the card 9. The antenna coil 11 is made by etching a copper foil or the like, so that deflection of the card 9 is allowed and that the thickness of the card 9 is not affected. The IC chip 12 is connected to both ends of the antenna coil 11. The antenna coil 11 is adapted to its required function by appropriately setting its number of turns, the wire-to-wire intervals, etc. The antenna coil 11 is made to perform non-contact information transmission using, as a transmission medium, magnetic field induced by mutual induction. The maximum distance over which information can be transmitted between the identifying information recording device 2 and the identifying information reading device 3 is usually about several centimeters. Therefore, the identifying information reading device 3 is positioned to be capable of contacting the card 9 within the distance of several centimeters, which will be described later more specifically.

The identifying information reading device 3 is a means for reading information recorded on the identifying information recording device 2. The identifying information reading device 3 reads the above-mentioned information during the games. The identifying information reading device 3 comprises a transmitter-receiver (not shown) that performs non-contact information transmission to and from the antenna coil 11 using induction magnetic field as a transmission medium. The transmitter-receiver performs non-contact information transmission to and from the antenna coil 11 using magnetic field induced by mutual induction as a transmission medium. The identifying information reading device 3 is provided at a card takeout slot 16 of a card distributor 15 and in card distribution areas 18 of a card game playing table 17, which will be described later.

The card distributor 15 is a container for holding the cards 9 to be taken out one by one. If necessary, the function of shuffling the cards 9 is provided. The card takeout slot 16 is provided as shown in FIG. 1 on the front face of the card distributor 15, so that the cards 9 may be taken out one by one through the card takeout slot 16. An identifying information reading device 3A is provided in a position facing the card takeout slot 16. The identifying information reading device 3A is provided in that position because the card takeout slot 16 is the place that inevitably comes into contact with a card 9 when it is taken out. In the case the card distributor 15 is fixed to the game card table 17, the identifying information reading device 3A is attached to a position in the card distributor 15 facing the card takeout slot 16, or to a position in the card game table 17 facing the card takeout slot 16. In the case the card distributor 15 is not fixed to the game card table 17, the identifying information reading device 3A is attached to a position facing the card takeout slot 16 in the card distributor 15. Thus, it is arranged that the identifying information reading device 3 may come into contact with the cards 9 taken out of the card takeout slot 16 within a distance of several centimeters (communicable distance).

The form of the card game table 17 in plan view is straight on its dealer side and curved on its players side. Accordingly, a game is played with three players sitting along the curved players side and a dealer sitting on the straight dealer side of the card game table 17. The top surface of the card game table 17 has four card distribution areas 18, one in front of the dealer and three in front of respective players, on which cards 9 are laid as distributed during games. Each of the four card distribution areas 18 is provided with the identifying information reading device 3. The individual identifying information reading devices 3B to 3E are embedded in the card game playing table 17, so that they come into contact with the cards 9 distributed in respective areas within the distance of several centimeters (communicable distance). The information read with the identifying information reading devices 3B to 3E is processed with the control device 4.

The control device 4 is a control means for performing various kinds of calculation or judgment (or calculation and judgement), required as the game goes on, from the identifying information read with the identifying information reading devices 3A to 3E. The control device 4 is connected as shown in FIG. 2 to the identifying information reading devices 3B to 3E, the stake money handling devices 5A to 5C, the display devices 6A to 6C, the output device 7A on the card game playing table 17 side, and the output device 7B on the monitoring station side. The control device 4 comprises a CPU, a ROM, a RAM etc. with these components constituting a recording section, a processing section and an output section.

The recording section records the contents of cards taken out of the card distributor 15, the contents of the card in the hands of the dealer and the players (game results), stake money of each player, refund money associated with the game results, money balance, etc. for every game. The recording section also records information on the contents of games such as the rules of games, card combinations, and superiority order of such combinations.

The processing section carries out various processes on the basis of information recorded in the recording section; for example win-loss judgment according to the card contents (card combinations), calculation of refund money related to the game results, summing up the money balance, etc. Since win or loss of the card game is decided by the sum of numerals or the card combination, contents of respective cards and contents of all the cards in the hands of the dealer and the players read with the respective identifying information reading devices 3 are recognized and compared with the game rules recorded in the recording section to decide win or loss. Amounts of refund money related to win or loss are calculated according to the game rules etc. Money balance is summed up at the end of every game and recorded in the recording section. The summing up may be made at the end of the final game. That is to say, it may be arranged that the amount of refund etc. is recorded in the recording section at the end of each game, and the money balance of all the games is summed up after the end of the final game and recorded in the recording section. The term final game here refers to the game at the end of the business hour or when the dealers take turns. The results of the processing section are all recorded in the recording section. The information on the processed results at the processing section or on the game results recorded in the recording section is sorted for every game and recorded in the recording device 8 for example after the end of the final game.

The output section outputs appropriately the results of summing process with the processing section to the display device 6 or the output device 7.

The stake money handling device 5 is a means operated by each player to enter or change stake money. The stake money handling device 5 is provided on each player side of the card game playing table 17. That is to say, three stake money handling devices 5 are provided on the marginal portion of the card game playing table 17 to face respective players. The stake money handling device 5 is provided with numeral keys for the player to enter stake money amount by manual operation.

The display device 6 is a means for displaying the results of judgment or calculation (or calculation and judgement) with the control device 4. Specifically as shown in FIG. 4, the display device 6 displays the stake points the player has entered and winning points. Besides these items, the display device 6 also displays as required refund money amounts accruing from the game results. Deep side of each of the three card distribution areas 18 on the players' side is provided with the display device 6 to display each player's stake money, etc.

The output device 7 is a means for outputting the results of money balance summed up with the control device 4 after the end of the game etc. The output devices 7 comprising a monitor and a printer are provided in the monitoring station of the casino and at the card game playing table 17 respectively. The output device 7A on the card game playing table 17 side is directly connected to the control device 4. The output device 7B on the monitoring station side is connected to the control device 4 through an interface circuit 22 and a computer 23 on the monitoring station side. Incidentally, the output device 7 is provided at either one or both of the monitoring station and the card game playing table 17 as required.

The recording device 8 is a means for recording the identifying information read with identifying information reading device 3 and the results of judgment or calculation (or calculation and judgement) made with the control device 4. The recording device 8 is constituted with a recording means such as a hard disk. Information of the control device 4 (information on processed results with the processing section and the game results recorded in the recording section) is recorded in the recording device 8. Specifically, such information is sorted and recorded for respective games after the end of each game or the final game, and arranged as a database.

The card game monitoring system 1 constituted as described above works as described below. The description is made on the basis of the flowchart shown in FIG. 5.

In actual games, the dealer takes out the cards 9 one by one from the card takeout slot 16 of the card distributor 15 and appropriately distributes them in the card distribution areas 18 of the dealer's own and the players. The players with cards in hand examine the contents of the cards, decide stake money amounts and enter them using the stake money handling devices 5. As the game goes on, the dealer distributes additional cards 9 appropriately. When the game is over and a win-loss is decided, amounts of chips commensurate with the stake money amounts and card combinations are paid to the winning players. After that, the dealer distributes again the cards 9 to start the next game.

At this time, the following process is carried out with the card game monitoring system 1.

First a judgment is made whether or not the identifying information reading devices 3A to 3E have read the identifying information recorded in the identifying information recording devices 2 of the cards 9 taken out of the card takeout slot 16 and of the cards 9 distributed in the card distribution areas 18 (step S1). In the case any of the identifying information reading devices 3A to 3E have read the identifying information, the identifying information is recorded in the recording section of the control device 4 (step S2), and the process goes back to the step S1. The pieces of information read with the identifying information reading devices 3A to 3E are recorded as those respectively corresponding to the card taken out slot 16, the dealer and players.

When no identifying information is read with the identifying information reading devices 3A to 3E, it is judged whether or not stake money amounts have been entered with the stake money handling devices 5 (step S3). In the case stake money amounts are entered with the stake money handling devices 5, the stake money amounts are recorded as corresponding to respective players in the recording section of the control device 4 and at the same time, is displayed as stake money amounts with the output section on the display device 6 (step S4), and the process goes back to the step S1.

In the case no stake money entry has been made with the stake money handling device 5, whether or not a game is over is determined (step S5). The end of the game is determined in various patterns. In the case the number of times up to which the cards 9 may be changed is predetermined, the number of reading the identifying information with the identifying information reading devices 3B to 3E is detected (in the case identifying information of plural cards 9 is read at a time, it is counted as one), compared with a preset number, and determined if the game is over or not. In the case of a game mode of laying all the cards 9 in the card distribution areas 18 at the game end, the game end is confirmed by whether or not the identifying information reading devices 3 in the card distribution areas 18 have detected identifying information of all the cards 9 taken out of the card distributor 15. Otherwise, the game end is determined by detecting game end patterns corresponding to the types of games. In the case the game is determined not to have finished, the process goes back to the step S1.

In the case the game end is confirmed, win or loss is determined on the basis of the game rule recorded in the recording section and from the card combinations, and displayed on the display devices 6A to 6C (step S6). Besides, summing up of the game is carried out (step S7). The information on the contents of the summing up, stake money, refund money, combinations of the cards 9, etc. are recorded corresponding to the dealer and players.

Next, the final game end is determined (step S8). In the case the final game is judged not to have finished yet, the process goes back to the step S1. In the case the final game end is confirmed, results summed up are outputted to the recording device 8 and to the output device 7B on the monitoring station side (step S9) and to the like.

In the recording device 8, game results are sorted for every game, accumulated and arranged into a database. The data accumulated in the recording device 8 may be examined appropriately as required.

Incidentally, while the identifying information reading devices 3A to 3E for reading the identifying information of the cards 9 in play in the above embodiment are provided in the card distribution areas 18, they may be provided in other areas. For example, they may be provided over the entire card game playing table 17, if there is a possibility of the cards 9 being laid in positions other than the card distribution areas 18.

Besides, while the above embodiment is described with the card game monitoring system 1 built in the card game playing table 17, the card game monitoring system 1 may be used together with any playing table other than the card game playing table 17 as a matter of course. Furthermore, the game may be of any other types such as mahjong, Othello, chess, etc. using steric pieces.

While the above embodiment is assumed to be provided with the stake money handling device 5 for manually entering the stake money amount, the entry action may be made automatic. In that case, a stake area for placing chips is provided in part of the upper side surface of the game playing table 17 near the card distribution area 18 on the player side, to provide there an identifying information reading device 3. Additionally, an identifying information recording device 2 is provided in chips. Thus, the stake money amount staked by the player is read with the identifying information reading device 3 and processed as described above with the control device 4.

While the above embodiment is not provided with a separate warning device, a warning device may be also provided to issue a notice when inconsistency is present between pieces of card information. When inconsistency is present between a piece of card information read with the identifying information reading device 3A at the card takeout slot 16 of the card distributor 15 and pieces of card information read with other identifying information reading devices 3B to 3E, it is possible that some cards 9 have been missing or replaced. Therefore, a warning device may be provided to give out notices.

The embodiments of the present invention described above in detail provides the following effects.

(1) Identifying information recorded with the identifying information recording means in the game-use object such as playing cards is read with the identifying information reading means. Based on the identifying information, the control means carries out calculation of refund money amounts, money balance, and win-or-loss judgment that become necessary as the game goes on, and the results are displayed on the display means. Therefore, there is no room for human intervention, so that human errors are precluded. As a result, calculation errors and fraudulence are precluded and the work of the dealer's accounting process is alleviated. Besides, monitoring staff are made unnecessary, providing a drastic reduction in costs.

(2) Provision of the stake money handling means facilitates the player in entering the stake money amount and enables automatic summing up calculation thereafter.

(3) Provision of the output means for outputting the summed up results makes it possible to output results of money balance and to alleviate the dealer's accounting work.

(4) When the above game monitoring system is used in card games, card combinations can be easily recognized and the game results can be easily recognized. Thus, it is possible to calculate accurately the chip money payable to the game winners.

(5) As the recording means is provided to record the identifying information and the results of calculation or judgement (or calculation and judgement), and to accumulate the game results as a database, fraudulent acts may be found retroactively by reviewing. In other words, if any doubt arises at a later date, fraudulent acts, if any, may be retroactively found by reviewing the game results, etc. of that date.

(6) Building the above game monitoring system in the game playing table prevents calculation errors and wrong acts from occurring related to the games played on the game playing table, and the accounting work of the dealer is facilitated. Besides, monitoring staff are made unnecessary and the running cost is drastically reduced.

What is claimed is:

1. A game monitoring system for monitoring a game played using a plurality of cards, the system comprising:

a plurality of wirelessly communicating identifying information recording devices, a respective wirelessly communicating identifying information recording device being attached to each of the plurality of cards, and recording information identifying respective cards and a date and a place related to location of the game monitoring system;

an identifying information reading device for reading, wirelessly, the information recorded in the identifying information recording devices, the identifying information reading device being embedded in a card game playing table;

a stake money handling device operable by players of the game for entering and/or changing stake money amount;

a control device calculating a money balance in the game using the cards, based on the identifying information read by the identifying information reading device and the stake money amount entered and/or changed through the stake money handling device, recording the information recorded in the identifying information recording devices of the cards and read by the identifying information reading device, and the money balance calculated, and accumulating the identifying information read by the identifying information reading device and the money balance calculated in a database, wherein the control device determines when a game has ended from at least one of when number of times the identifying information reading device has read the identifying information of cards has reached a predetermined number for a card game in which cards may be changed no more than the predetermined number of times, and when the identifying information has been read by the identification information reading device from all cards distributed to card distribution areas on the card game playing table for a card game in which all of the cards distributed are placed in card distribution areas of the card game playing table at game end; and a display displaying the money balance calculated by the control device, the display device being located at the card game playing table for playing of the game with the card distributed to and placed on the card game playing table.

2. A card game playing table for playing a game with cards, comprising the game monitoring system according to claim 1 installed therein.

3. The game monitoring system according to claim 1, further comprising an output device outputting a sum of money balances, summed by the control device, after ending of the game.

4. A card game playing table for playing a game with cards, comprising the game monitoring system according to claim 3 installed therein.

5. The game monitoring system according to claim 3, comprising a monitoring station, wherein the output device is located in the monitoring station or at the card game playing table for monitoring at least one of the game and the card game playing table.

6. A card game playing table for playing a game with cards, comprising the game monitoring system according to claim 5 installed therein.

7. The game monitoring system according to claim 3, including output devices in both of the monitoring station and the card game playing table for monitoring the game and the card game playing table, respectively.

8. A card game playing table for playing a game with cards, comprising the game monitoring system according to claim 7 installed therein.

9. The game monitoring system according to claim 1, further comprising a card distributor for distributing the card, wherein the card game playing table includes card distribution areas where the card is distributed, and the identifying information reading device is located at each of the card distributor and the card distribution areas.

10. The game monitoring system according to claim 9, further comprising a warning device for issuing a notice when an inconsistency is present between the identifying information read by the identifying information reading device in the card distributor and the identifying information read by the identifying information reading device in the card distribution areas.

11. A card game playing table for playing a game with cards, comprising the game monitoring system according to claim 10 installed therein.

12. A card game playing table for playing a game with cards, comprising the game monitoring system according to claim 9 installed therein.

13. A game monitoring method for monitoring a game played using a plurality of cards, the method comprising:

recording identifying information, identifying each of the cards, and a date and a place related to playing of the game, in a respective identifying information recording device attached to each of the cards;

reading, wirelessly, the identifying information recorded in the identification information recording devices with an identifying information reading device embedded in a card game playing table;

entering and/or changing stake money amount in the game by players of the game;

calculating a money balance in the game, based on the identifying information read and the stake money amount entered and/or changed by a control device;

recording the identifying information read from the cards and the money balance calculated by the control device;

accumulating the identifying information read from the cards and the money balance calculated by the control device in a data base;

determining when a game has ended from at least one of when number of times the identifying information reading device has read the identifying information of cards has reached a predetermined number for a card game in which cards may be changed no more than the predetermined number of times, and when the identifying information has been read by the identification information reading device from all cards distributed to card distribution areas on the card game playing table for a card game in which all of the cards distributed are placed in the card distribution areas of the card game playing table at game end; and displaying the money balance calculated at the card game table for playing the game with the card distributed on and placed on the card game playing table.

14. The game monitoring method according to claim 13 including, after the ending of a game, outputting a sum of money balances.

15. The game monitoring method according to claim 13 including monitoring at least one of the game and the card game playing table.

16. The game monitoring method according to claim 13, further comprising distributing the card from a card distributor to the card distribution areas of the card game playing table and reading the identification information recorded in the identifying information recording devices at the card distributor and at the card distribution areas.

17. The game monitoring method according to claim 16, further comprising issuing a notice when an inconsistency is present between the identifying information read at the card distributor and the identification information read at the card distribution areas.

* * * * *